United States Patent [19]

Rees et al.

[11] Patent Number: 5,093,394

[45] Date of Patent: Mar. 3, 1992

[54] THERMOFORMABLE ACOUSTICAL MAT COMPOSITION AND METHOD

[75] Inventors: John L. Rees, Toledo, Ohio; Doug Langhorst, Zeeland, Mich.

[73] Assignee: Sheller-Globe Corporation, Detroit, Mich.

[21] Appl. No.: 249,850

[22] Filed: Sep. 27, 1988

[51] Int. Cl.$^5$ ............................................. C08L 95/00
[52] U.S. Cl. .................................... 524/68; 524/69
[58] Field of Search ................................ 524/68, 69

[56] References Cited

U.S. PATENT DOCUMENTS

| | | | |
|---|---|---|---|
| 2,001,916 | 5/1935 | Mazer | 154/44 |
| 2,009,811 | 7/1935 | Olsen | 108/8 |
| 2,047,576 | 7/1936 | Byers | 106/18 |
| 2,081,952 | 6/1937 | Parkinson | 154/44 |
| 2,221,499 | 11/1940 | Torri | 106/31 |
| 2,325,594 | 8/1943 | Denman | 154/44 |
| 2,742,373 | 4/1956 | Groskopf | 106/277 |
| 2,742,374 | 4/1956 | Groskopf | 106/277 |
| 2,887,428 | 5/1959 | Baymiller et al. | 162/145 |
| 3,056,707 | 10/1962 | Helbing et al. | 154/44 |
| 3,243,374 | 3/1966 | Gillard | 252/62 |
| 3,429,728 | 2/1969 | Goldstone et al. | 117/11 |
| 3,630,310 | 12/1971 | Federer | 181/33 G |
| 3,652,360 | 3/1972 | Hartman et al. | 156/244 |
| 3,881,569 | 5/1975 | Evans, Jr. | 181/33 K |
| 3,948,009 | 4/1976 | Bernhard | 52/144 |
| 4,042,745 | 8/1977 | Cornwell et al. | 428/310 |
| 4,064,960 | 12/1977 | Murakami | 181/210 |
| 4,097,633 | 6/1978 | Focht | 428/138 |
| 4,099,590 | 7/1978 | Martin, Sr. | 180/69 C |
| 4,133,932 | 1/1979 | Peck | 428/323 |
| 4,190,131 | 2/1980 | Robinson | 181/296 |
| 4,194,329 | 3/1980 | Wendt | 428/74 |
| 4,226,299 | 10/1980 | Hansen | 181/284 |
| 4,255,195 | 3/1981 | Holter et al. | 106/18.12 |
| 4,263,196 | 4/1981 | Schumacher et al. | 260/33.6 |
| 4,278,146 | 6/1981 | Lerner et al. | 181/210 |
| 4,287,263 | 9/1981 | Woodring et al. | 428/489 |
| 4,301,890 | 11/1981 | Zalas | 181/286 |
| 4,308,308 | 12/1981 | Sachse | 428/168 |
| 4,325,457 | 4/1982 | Docherty et al. | 181/210 |
| 4,328,650 | 5/1982 | Garbell | 52/202 |
| 4,330,046 | 5/1982 | Lerner et al. | 181/210 |
| 4,358,090 | 11/1982 | Glaesener | 256/13.1 |
| 4,367,807 | 1/1983 | Fink et al. | 181/230 |
| 4,373,113 | 2/1983 | Winkler et al. | 174/179 |
| 4,373,608 | 2/1983 | Holmes | 181/202 |
| 4,379,190 | 4/1983 | Schenck | 428/95 |
| 4,382,384 | 5/1983 | Mitchell et al. | 73/594 |
| 4,386,676 | 6/1983 | Gadde et al. | 181/290 |
| 4,402,384 | 9/1983 | Smith et al. | 181/210 |
| 4,430,465 | 2/1984 | Abbott | 524/64 |
| 4,452,841 | 6/1984 | Oliveira | 428/174 |
| 4,456,092 | 6/1984 | Kubozuka et al. | 181/290 |
| 4,456,705 | 6/1984 | McCarthy | 521/83 |
| 4,463,049 | 7/1984 | Kracke | 428/281 |
| 4,478,912 | 10/1984 | Uffner et al. | 428/349 |
| 4,480,715 | 11/1984 | Brooks | 428/71 |
| 4,495,240 | 1/1985 | McCarthy | 428/319.1 |
| 4,508,771 | 4/1985 | Peoples, Jr. et al. | 428/95 |
| 4,522,284 | 6/1985 | Fearon et al. | 181/292 |
| 4,529,639 | 7/1985 | Peoples, Jr. et al. | 428/95 |
| 4,538,390 | 9/1985 | Yeager et al. | 52/221 |
| 4,566,558 | 1/1986 | Link, Jr. et al. | 181/210 |
| 4,574,915 | 3/1986 | Gahlau et al. | 181/290 |
| 4,579,764 | 4/1986 | Peoples, Jr. et al. | 428/95 |
| 4,600,078 | 7/1986 | Wirt | 181/286 |
| 4,620,860 | 11/1986 | Werbowy | 65/3.4 |
| 4,643,271 | 2/1987 | Coburn | 181/210 |
| 4,661,392 | 4/1987 | Kapstad | 428/182 |
| 4,663,224 | 5/1987 | Tabata et al. | 428/246 |
| 4,663,381 | 5/1987 | Blumel et al. | 524/426 |
| 4,674,593 | 6/1987 | McCarty | 181/210 |
| 4,734,323 | 3/1988 | Sato et al. | 428/317.3 |
| 4,829,109 | 5/1989 | Ciaccia et al. | 524/68 |
| 4,891,272 | 1/1990 | Ciaccia | 428/489 |

OTHER PUBLICATIONS

"Polyethylene and Ethylene Copolymers" by J. V. Benham; Modern Plastics Encyclopedia, 1985-1986, vol. 62; No. 10A.

"Polyethylene Resins" by Dr. A. B. Zimmerman/U.S. Industrial Chemicals Co.; Modern Plastics Encyclopedia; 1968, vol. 45, No. 14A.

Brochure by Werner & Pfleiderer Corporation entitled: "ZSK Twin-Screw Extrusion Systems for Compounding, Filling, Reinforcing and Finishing Polymer Materials".

Brochure by Northern Fibre Products, a division of Sheller-Globe Corporation, entitled: "Northern Fibre Products—Complete Design and Manufacturing Capability for Insulation and Sound Barrier Technology".

Primary Examiner—Melvyn I. Marquis
Assistant Examiner—Karen A. Hellender
Attorney, Agent, or Firm—Dinnin & Dunn

[57] ABSTRACT

A thermoformable acoustical mat composition having reduced quantities of ethylene vinyl acetate and elastomers and increased filler concentrations. The composition includes an intimate blend of 5% to 30% of an asphalt constituent; 4% to 15% of an elastomer binder constituent; 50% to 80% of a filler constituent and 1% to 8% of an ethylene co-polymer constituent. A method of melt mixing and extrusion forming thermoformable acoustical mat compositions is also provided.

9 Claims, No Drawings

THERMOFORMABLE ACOUSTICAL MAT COMPOSITION AND METHOD

BACKGROUND

The present invention relates to thermoformable acoustical mat compositions. More specifically the present invention relates to thermoformable mat compositions which have high filler concentrations and contain asphalt and a low content of both EVA and rubber elastomers thereby reducing the cost of the composition.

Sound deadening compositions have been used in vehicles such as passenger cars and trucks, commercial trucks and the like for many years. Types of compositions used in sound insulation vary from standard insulation types such as fiberglass mattings to coating type sound deadeners which may be sprayed or brushed onto various areas of a vehicle to provide sound deadening characteristics.

In certain applications a thicker more dense composition may be required than that which may be acquired using either normal insulation or coating type compositions. These compositions are sometimes referred to as acoustical mats. Acoustical mats are sheets of sound deadener material placed advantageously in the vehicle or automobile for protection of the interior from undesirable sound.

Acoustical mat compositions which are presently used in automotive or other vehicle applications are generally one of two types. In one type of acoustical mat it is desired to have direct contact and bonding between the mat and a body panel such that the mat attenuates panel resonance type sounds due to road vibrations and the like. Generally compositions which are useful in such a mat are heat bondable compositions which provide controlled wilting and bonding to the body panel, when the body panel with the composition attached thereto is heated during a paint cycle or the like. A second type of acoustical mat composition is a thermoformable acoustical mat. These compositions are designed such that they may be adhered to a backing substrate such as a foam, shoddy or mat material after they are thermoformed into a contoured shape or in situ during the thermoforming process. These compositions act to attenuate sound noises such as road noises, engine noises and the like.

The heat bondable mat compositions require controlled flow characteristics in a given temperature range such that they may conform to the shapes which they are designed to bond to during the heating process. Heat bondable mat compositions also require the capability for heat bonding to the body panel material when in position and at the time of heating. A third characteristic of these heat bondable materials is sound attenuation capability which of course must be up to specification as with any sound attenuator. Physical characteristics such as the low temperature stress characteristics and the second order temperature of the asphalt are also important characteristics in the heat bondable materials.

Thermoformable acoustical mat compositions, on the other hand, require much more stringent physical properties than the heat bondable mat compositions. Thus, good properties of tensile strength, elongation, modulus, controlled stiffness, controlled specific gravity, resistance to shrinking, low temperature flexibility, low flammability and the low staining properties are all important in a thermoformable composition. The necessity of these increased physical properties is because these materials must be thermoformed into and retain their contoured shapes with minimal shrinkage. These materials also require good adhesive capability for attachment of substrate insulating materials such as shoddy materials, resinous mat materials, and urethane foam substrates which are used between this material and the underlying sheet metal surface. Thus, the thermoformable acoustical mat materials must act as a relatively rigid skeleton member in order to retain the shape and give structural firmness to the backing material.

Because of the lower physical property requirements, in heat bondable acoustical sheets it has generally been found that asphalt based mixtures are particularly suitable for heat bondable sheets. Various mixtures of asphalts and fillers combined with various compositions provide the necessary heat bonding adhesiveness and melt characteristics in the final compositions and are known in the heat bondable art. For example, U.S. Pat. No. 4,287,263 to Woodring discloses a heat bondable sheet material having 30% asphalt, 20% mica, and 50% limestone with a heat deteriorating polyethylene film for stacking capability. U.S. Pat. No. 4,133,932 to Peck discloses a heat bondable material having 45% to 75% asphalt, 5% to 20% of elastomeric modifier and 1.5% to 3.5% of a vegetable oil reaction product.

Due to the belief that the asphaltic type materials were useful in the heat bondable materials for providing selective melt characteristics and inherent adhesive characteristics, and because of the relatively messy and sticky products produced, these materials have generally not been believed to be advantageous in thermoformable type acoustical mat materials due to the flow properties and other undesirable properties which they impart in the compositions. It was believed in the thermoformable art that in order to provide proper thermoformable characteristics which would also result in good physical properties it was generally necessary to provide elastomer based materials having relatively high quantities of elastomeric material with some filler therein.

In recent years the use of ethylene vinyl acetate based elastomer materials has become prevalent in the art of thermoformable acoustical mat compositions. While these materials have been sufficient in physical properties and sound barrier properties, the cost of elastomeric materials, (and particularly the EVA materials), has increased to a dramatic extent in the recent years. Compositions of the past comprised various EVA oil and filler compositions such as shown in U.S. Pat. No. 4,379,190 to Shank; U.S. Pat. No. 4,263,196 to Schumacher; and U.S. Pat. No. 4,508,771 to Peoples. While these compositions are suitable for use as thermoformable acoustical mat compositions, the price of raw material has increased significantly in recent years and costs of producing these compositions has likewise increased.

Acoustical mat products in the market place are usually purchased under long term procurement contracts with automobile companies and the like and as such prices are not readily adjustable to take into consideration cost increases. Thus, in recent years, the profit margins have been reduced dramatically or lost entirely due to the increased cost of these compositions.

Therefore, low cost substitutes for conventional EVA/elastomer based thermoformable mat compositions are in great demand in the industry.

It has therefore been a goal in the art to produce a thermoformable acoustical mat composition which has reduced quantities of EVA and other elastomers used in thermoformable elastomer blends while maintaining or increasing the necessary physical properties of the final thermoformed sheet.

While attempts have been made at reducing EVA contents by increasing filler contents these attempts have generally failed in producing a final product with necessary physical properties for a thermormable sheet or these types of compositions required special machinery or processes for production of such compositions.

In the specification below all percentages are percentages by weight unless otherwise stated.

SUMMARY OF THE INVENTION

In the present invention there is provided a thermoformable acoustical mat composition of reduced EVA and elastomer content which uses a quantity of asphalt in the composition and allows use of high quantities of fillers. The resulting compositions result in a net reduction in costs of from 33% to 50% when compared to compositions presently in use. Thermoformable mat compositions of the present invention also meet the stringent standards of physical properties for thermoformable acoustical mat for use in the automotive industry.

According to the present invention there is provided a thermoformable acoustical mat composition which is an intimate mixture of, from about 5% to about 30% of an asphalt constituent, from about 4% to about 15% of an elastomer binder constituent, from about 50% to about 80% of a filler constituent and from about 1% to about 8% of an ethylene co-polymer constituent. Also provided in the present invention is a process in which a thermoformable acoustical mat can be melt mixed with conventional mixing apparatuses such as a sigma blade mixer by melt mixing the above composition at a temperature from about 300°–400° F. and forming a sheet using a temperature controlled mill with a temperature from about 30° F.–200° F.

A method for formulating an article from an acoustical mat composition is also provided by thermoforming a sheet produced in the above steps and in situ or thereafter attaching a substrate material thereto.

Also provided in the present invention is a process for extrusion formulation of a thermoformable acoustical mat composition having the above constituents by formulating the composition in an extrusion apparatus using an ethylene vinyl acetate composition having a low melt index. This process includes the use of a split asphalt feed distribution wherein less than about 50% of the asphalt is fed upstream at the feed throat and the remainder of the asphalt if fed downstream during the extrusion process.

A process for forming a thermoformable acoustical mat composition comprises the steps of: (a) providing a raw mixture of a composition in a suitable melt mix container, said raw mixture comprising: from about 15% to about 25% of an asphalt constituent; from about 4% to about 8% of an elastomer binder constituent; from about 60% to about 75% of a filler constituent; and from about 1% to about 5% of an ethylene vinyl acetate copolymer constituent; and (b) melt mixing this raw mixture by heating the container to a temperature of from about 300° to 400° F. while mixing; and wherein said ethylene vinyl acetate constituent has a melt index of from about 1 to about 20.

A further more detailed understanding of the present invention can be obtained from the following disclosure.

DESCRIPTION OF THE PREFERRED EMBODIMENTS

According to the present invention there is provided a thermoformable acoustical mat composition. The composition of the present invention comprises an intimate blend of an asphalt constituent, an elastomer binder constituent, a filler constituent, and an ethylene co-polymer constituent. Generally compositions of the present invention include from about 5% to about 30% of the asphalt constituent, from about 4% to about 15% of the elastomer binder constituent, from about 50% to about 80% of the filler constituent, and from about 1% to about 8% of an ethylene co-polymer constituent. Typically, compositions of the present invention include from about 15% to about 25% of the asphalt constituent, from about 4% to about 8% of the binder constituent, from about 60% to about 75% of the filler constituent, and from about 1% to about 5% of the ethylene co-polymer constituent. Preferably in compositions of the present invention from about 19% to about 25% of the asphalt constituent is used, from about 6% to about 8% of a binder constituent is used, from about 65% to about 75% of the filler constituent is used and from about 1% to 4% of the ethylene vinyl acetate constituent is used.

The use of an asphalt constituent in the thermoformable acoustical mat composition of the present invention allows reduction in the use of the more expensive elastomer binders and ethylene co-polymers in an acoustical mat composition. Thus, due to the relatively inexpensive cost of asphaltic or bituminious materials the resulting composition has an appreciably lower cost than prior art compositions using only elastomer and ethylene co-polymer blends. An inexpensive roofing asphalt type composition which is of a suitable grade, has a medium softening point, with medium penetration is used in the present invention. A particularly suitable asphalt composition for use in the present invention is a Trumbull 3400 asphalt obtainable from Owens Corning Company, commonly used as a roofing asphalt. The asphalt material selected should be suitable for compatible blending with the rubber elastomer material used in the present invention.

Initially, during mixing the asphalt and elastomer binder form a solution. As the mixing continues the elastomer binder constituent acts as the continuous phase and dissolves the asphalt and the filler.

The elastomer binder material may be of a rubber type elastomer compound which is compatible with the asphalt type material. Suitable elastomer rubbers for use in the present invention include ethylene propylene diene monomer elastomers, styrene butadiene elastomers, polystyrene co-butylene styrene elastomers, styrene butadiene styrene elastomers and mixtures thereof. It has been found that suitable elastomer rubber materials for use in the present invention include Vistalon 3708 obtained from Exxon, Epsyn E901 obtained from Copolymer Rubber and Chemical Company of Baton Rouge, La. or Kraton ® obtainable from Shell Chemical Co.

The filler constituent used in the present invention depends on the properties which are required in the final compound. For instance, suitable fillers include road grade limestones, clay, barytes, talc, mica and mixtures of these materials. The mixture and concentrations of each of these materials may be varied depending on the final physical properties which are desired in the composition. For example, if an increase in stiffness is desirable the clay constituent of a filler may be increased. Stiffness can be reduced by the use of a higher amount of barytes as a filler. Of course, the cost and availability of these materials will also act to determine which types of filler materials will be most desirable for use in the present compositions of the present invention.

The ethylene co-polymer constituent of the present invention is preferably an ethylene vinyl acetate co-polymer which has a melt index range of from about 1 to about 20. In extruder mixing applications, an EVA material is used having a melt index from about 1 to about 3 and preferably the melt index of the EVA composition is about 2. For melt mixing applications it is preferable that the melt index of the EVA composition used is at the higher end of the above range. Preferred EVA compositions for use in melt mixing applications have a melt index of from about 15 to about 18. These materials are selected such that the vinyl acetate content of the EVA is from 8 to about 28 and preferably from about 12 to about 20. It has been found that high melt index EVAs may act as lubricants in certain mixtures of the present invention and therefore are not suitable in some applications. Suitable EVA resins include ELVAX 350 which is a grade of EVA available from Du Pont, and ESCORENE LD 704 and 623, available from Exxon. The EVA compound acts as a bonding enhancer in the final composition in that it allows these compositions to adhere readily with common adhesives for adhering substrates to the thermoformed shell produced from the compositions of the present invention.

Compositions of the present invention are suitable for melt mixing operations using standard equipment such as sigma blade mixers. In the past, it was found that the use of high filler contents in EVA or elastomer filler type thermoformable compositions was not readily practicable due to inherent limitations of conventional melt mixing apparatuses. However, in the present invention there is provided a process for melt mixing a thermoformable acoustic mat composition in conventional sigma type mixers. The process of the present invention comprises providing a raw mixture of an acoustical mat composition which includes from about 5% to about 30% of an asphalt constituent, from about 4% to about 15% of an elastomer binding constituent, from about 50% to about 80% of the filler constituent, and from about 1% to about 8% of an ethylene vinyl acetate constituent. This raw mixture is then placed in a suitable melt mix container and heated to a temperature of from about 300°–400° F. while mixing. Thereafter a thermoformable sheet can be formed by using a controlled temperature mill at a temperature of from about 30° F.–200° F. The sheet can be cured and thereafter can be thermoformed into a suitable shape.

During the thermoforming process or after thermoforming of the sheet, a substrate layer may be readily adhered to the sheet by conventional means. Suitable substrate layers useful with the thermoformable acoustical mats of the present include shoddy materials, resin particle mats, wool woven mats, and urethane foams among others. An advantage to the present invention is that these types of materials may be readily adhered to the thermoformable acoustical mat typically from the compositions of the present invention.

Typically the asphalt constituent comprises from about 15% to about 25% of the composition and preferably from about 19% to about 21% of the composition for use in this melt mixing process. Typically the rubber constituent comprises from about 4% to about 8% and preferably from about 6% to about 7% of the composition. The filler constituents typically comprise from about 60% to about 75% and preferably from about 65% to about 70% of the compositions. Typically the EVA content of the compositions useful in the melt mixing process of the present invention comprise from about 1% to about 5% of the composition and preferably from about 3% to about 4% of the composition. EVA's for use in the melt mix process typically have melt index of from about 15 to about 20 and preferably from 15 to about 18. Compositions of the present invention can also be advantageously formulated in other conventional mixers such as a Farrel mixer or a Banbury mixer and therefore are very versatile in their uses.

It has also been found in the present invention that an extrusion process may be used to advantageously formulate these compositions. The extrusion process of the present invention includes providing an acoustical mat composition within the above ranges and formulating the composition by additions at the throat of the extruder of the binder constituent, the EVA constituent and the filler constituent. However, the process of the present invention is characterized in that it is preferred that the EVAs which are used in the extrusion operation must have a relatively low melt index of from about 1 to about 10. It has been found that if a higher melt index in this is used the EVA acts as a lubricant in the mixture and the mixture tends to produce unmixed or partially mixed compositions which have substandard physical properties.

The extrusion process of the present invention is also characterized in that the asphalt feed is split wherein generally less than about 50% of the asphalt is fed upstream in the extrusion process, at or near the throat of the extrusion apparatus with the rubber EVA and filler and greater than about 50% is fed downstream of the throat during the extrusion process. Typically from about 10% to about 40% of the asphalt is fed upstream and from about 60% to about 90% of the asphalt is fed downstream in the extrusion apparatus. Preferably from about 20% to about 35% of the asphalt is fed upstream and from about 65% to about 80% of the asphalt is fed downstream. It has been found by this specific addition method of the asphalt that superior compositions may be obtained from an extrusion process of compositions of the present invention.

A particularly suitable extrusion apparatus is a twin screw extrusion system, Model No. ZSK produced by Werner & Pfleiderer, a German corporation located at 663 East Crescent Avenue, Ramsey, N.J. It has been found that the use of such an extruder provides suitable high level mixing which creates better physical properties in the final composition.

Compositions according to the present invention provide physical properties that pass the automobile manufacturers tests for thermoformable acoustical mat compositions. Compositions made in accordance with the teachings of the present invention may be produced in conventional apparatuses or may be produced in more intense formulation equipment such as a twin screw extruders. Compositions and thermoformed acoustical mat products produced therefrom provide advantageous cost reduction in the thermoformable sheet products of from 33% to 50% which is a substantial reduction in cost on an industry wide basis. This cost savings is possible because of the advantageous compositions of the present invention which provide for reduced quantities of EVA and elastomer binders by the inclusion of a low cost asphalt constituent.

The invention may be further understood by the following examples which are given by way of illustration but not limitation.

EXAMPLE 1

Compositions A, B and C were formulated with percentages of constituents as set forth in TABLE I.

TABLE I

| Material | % By Weight | | |
|---|---|---|---|
| | A | B | C |
| Epsyn E901 (EPDM) | 8 | 8 | 8 |
| Escorene LD 704 (EVA) | 1 | 3 | 1 |
| Trumbull 3400 (ASPHALT) | 23 | 24 | 18 |
| Limestone (road grade) | 69 | 65 | 75 |
| Total | 102 | 100 | 102 |

The compositions were compounded in a Werner & Pfleiderer ZSK twin screw extruder with 30% of the asphalt and the remainder of the constituents fed at the throat of the extruder and 70% of the asphalt is fed downstream later in the cycle. The materials were formed into sheet form and tested. The test results are summarized below in TABLE II.

TABLE II

| Analysis Data | A | B | C |
|---|---|---|---|
| Thermogravimetric | | | |
| Rubber | 6.4 | 7.8 | 6.5 |
| Limestone | 69 | 64.6 | 73.5 |
| Tensile, psi. | 192 | 213 | 231 |
| Elongation, %. | 355 | 654 | 421 |
| Specific Gravity. | 1.6 | 1.6 | 1.8 |
| Flammability | SE/NBR | SE/NBR | SE/NBR* |
| Shrinkage (7 days @ 80° C.) | 0.8 | 1.0 | 0.5 |
| Low Temp Flex. (−20° F. bend test) | DNC | DNC | DNC** |
| Stiffness, MPa. | 27 | 17 | 38 |

*Self Extinguishing/No Burn Rate
**Does Not Crack

As evidenced by these tests, compositions of the present invention provide advantageous physical properties in the properties of color, tensile strength, elongation, specific gravity flammability, shrinkage, low temperature flexibility and stiffness such as are desirable in thermoformable acoustical mat compositions used in the automotive industry.

EXAMPLE 2

A thermoformable acoustical mat composition was prepared by placing a mixture of the constituents as set forth below in Table III into an Arens melt mixer.

TABLE III

| Material | % by weight |
|---|---|
| Trumbull 3400 (ASPHALT) | 23 |
| Epsyn E901 (EPDM) | 8 |
| Escorene LD 623 (EVA) | 4 |
| Limestone | 65 |
| | 100 |

The raw materials were then melt mixed in the Arens mixer at a temperature of 350° F. for 40 minutes and pumped to a mix holding tank. The mixture was then formed into a sheet material 0.083" thick by use of a roller mill having a pair of hollowed rollers using a water temperature of about 60° to 65° F. circulated in the rollers. This material was tested. The results of the tests are set forth below in Table IV.

TABLE IV

| TEST DATA | |
|---|---|
| | Test Value |
| Color | Dark |
| Specific Gravity | 1.7 |
| Tensile strength, KPa | 2455 |
| Elongation, % | 56 |
| Tear Strength, N/M | 13658 |
| Stiffness, Mpa. | 29 |
| Flammability, as received, | SE/NBR* |
| after accelerated aging | SE/NBR |
| Fogging Resistance | 95 |
| Odor | No Objectionable Odor |
| Low Temperature Flexibility | Does Not Crack |
| Heat aging (Shrinkage) % | 0.6 |
| Staining. | Non-Staining |

*Self Extinguishing/No Burn Rate

As evidenced by these tests, the composition has good physical properties of tensile strength, elongation, stiffness, tear strength, flammability, fogging resistance, odor, low temperature flexibility, shrinkage and staining such as are desirable in thermoformable acoustical mat compositions used in the automotive industry.

What is claimed is:

1. A thermoformable acoustical mat composition consisting essentially of in weight %, an intimate blend of:
   from about 5% to about 30% of an asphalt constituent;
   from about 4% to about 15% of an elastomer binder constituent; wherein said binder constituent is selected from the group consisting of ethylene propylene diene monomer elastomers, styrene butadiene elastomers, polystyrene co-butylene styrene elastomers, and mixtures thereof,
   from about 50% to about 80% of a filler constituent; wherein said filler constituent is selected from the group consisting of limestone, clay, barytes, talc, mica and mixtures thereof, and
   from about 1% to about 8% of an ethylene co-polymer constituent, wherein said ethylene co-polymer constituent is comprised of ethylene vinyl acetate co-polymers having a melt index range of from about 1 to about 20.

2. The thermoformable acoustical mat composition of claim 1 wherein said ethylene co-polymer constituent is comprised of ethylene vinyl acetate co-polymers having a melt index range of from about 15 to about 18.

3. The thermoformable acoustical mat composition of claim 1 consisting essentially of an intimate blend of:
   from about 15% to about 25% of an asphalt constituent;
   from about 4% to about 8% of a binder constituent;
   from about 60% to about 75% of a filler constituent; and
   from about 1% to about 5% of an ethylene vinyl acetate copolymer constituent.

4. The thermoformable acoustical mat composition of claim 3 wherein said ethylene vinyl acetate constituent has a melt index of from about 1 to about 3.

5. The thermoformable acoustical mat composition of claim 3 wherein said ethylene vinyl acetate constituent has a melt index of from about 15 to about 18.

6. A process for forming a thermoformable acoustical mat composition consisting essentially of the steps of:
(a) providing a raw mixture of a composition in a suitable melt mix container, said raw mixture comprising:
from about 15% to about 15% of an asphalt constituent;
from about 4% to about 8% of an elastomer binder constituent;
from about 60% to about 75% of a filler constituent; and
from about 1% to about 5% of an ethylene vinyl acetate copolymer constituent; and
(b) melt mixing this raw mixture by heating the container to a temperature of from about 300° to about 400° F. while mixing; and wherein said ethylene vinyl acetate constituent has a melt index of from about 1 to about 20.

7. The process according to claim 6 wherein the binder constituent is selected from the group consisting of ethylene propylene diene monomer elastomers, styrene butadiene elastomers, ethylene butylene elastomers, and mixtures thereof.

8. The process according to claim 7 wherein said filler constituent is selected from the group consisting of limestone, clay, barytes, talc, mica and mixtures thereof.

9. The thermoformable acoustical mat composition of claim 6 wherein said ethylene vinyl acetate constituent has a melt index of from about 15 to about 18.

* * * * *

UNITED STATES PATENT AND TRADEMARK OFFICE
CERTIFICATE OF CORRECTION

PATENT NO. : 5,093,394
DATED : March 23, 1992
INVENTOR(S) : John Rees, et. al.

It is certified that error appears in the above-indentified patent and that said Letters Patent is hereby corrected as shown below:

Column 9, line 6, claim 6, "15%" (second occurrence) should be --25%--.

Signed and Sealed this

Sixth Day of July, 1993

*Attest:*

MICHAEL K. KIRK

*Attesting Officer*     *Acting Commissioner of Patents and Trademarks*